US008863616B2

(12) United States Patent
Ciavatta et al.

(10) Patent No.: US 8,863,616 B2
(45) Date of Patent: Oct. 21, 2014

(54) BICYCLE PEDAL CRANK, INTERMEDIATE PRODUCT AND METHOD FOR MANUFACTURING SUCH A PEDAL CRANK

(75) Inventors: Gabriele Ciavatta, Rome (IT); Mauri Feltrin, Nanto (IT)

(73) Assignee: Campagnolo S.R.L., Vicenza (IT)

( * ) Notice: Subject to any disclaimer, the term of this patent is extended or adjusted under 35 U.S.C. 154(b) by 1204 days.

(21) Appl. No.: 11/501,656

(22) Filed: Aug. 9, 2006

(65) Prior Publication Data
US 2007/0199403 A1 Aug. 30, 2007

(30) Foreign Application Priority Data

Feb. 14, 2006 (EP) ..................................... 06425087

(51) Int. Cl.
*B62M 3/00* (2006.01)
(52) U.S. Cl.
CPC ....................................... *B62M 3/00* (2013.01)
USPC ......................................................... 74/594.1
(58) Field of Classification Search
USPC ........................... 74/560, 594.1, 594.2, 594.3
See application file for complete search history.

(56) References Cited

U.S. PATENT DOCUMENTS

| | | | |
|---|---|---|---|
| 3,080,893 A | 3/1963 | Craycraft | |
| 4,237,948 A | 12/1980 | Jones et al. | |
| 4,339,490 A | 7/1982 | Tada et al. | |
| 4,414,860 A * | 11/1983 | Brunsch et al. | ............. 74/579 E |
| 4,657,795 A | 4/1987 | Foret | |
| 4,671,336 A | 6/1987 | Anahara et al. | |
| 4,811,626 A | 3/1989 | Bezin | |
| 4,856,801 A | 8/1989 | Hollingsworth | |
| 5,215,322 A | 6/1993 | Enders | |
| 5,271,784 A | 12/1993 | Wu et al. | |
| 5,435,869 A | 7/1995 | Christensen | |
| 5,624,519 A * | 4/1997 | Nelson et al. | ................. 156/245 |
| 5,632,940 A | 5/1997 | Whatley | |
| 5,667,857 A | 9/1997 | Watanabe et al. | |
| 5,851,459 A | 12/1998 | Chen | |

(Continued)

FOREIGN PATENT DOCUMENTS

| | | |
|---|---|---|
| CN | 2278644 Y | 4/1998 |
| CN | 1186917 | 7/1998 |

(Continued)

OTHER PUBLICATIONS

English translation of Dec. 21, 2010 Office Action issued in corresponding Japanese Appln. No. 2004-173152.

(Continued)

*Primary Examiner* — Vicky Johnson
(74) *Attorney, Agent, or Firm* — Volpe and Koenig, P.C.

(57) ABSTRACT

A bicycle pedal crank has an elongated body and a first end portion with a first seat for coupling with a bottom bracket of the bicycle, a second end portion with a second seat for coupling with a pedal, and an intermediate portion extending between the first end portion and said second end portion and having an inner portion substantially without structural strength and a first reinforcement structure. The first reinforcement structure has a tubular structure arranged around said inner portion and extending longitudinally not longer than the longitudinal extension of the intermediate portion. The extension of the tubular element is limited to the intermediate portion of the pedal crank. The crank may be manufactured in a simple, quick way in a completely automated manner, using a filling material molded under high pressure.

21 Claims, 12 Drawing Sheets

(56) References Cited

U.S. PATENT DOCUMENTS

| | | |
|---|---|---|
| 6,305,243 B1 | 10/2001 | Chiang |
| 6,324,940 B1 * | 12/2001 | Pazdirek et al. ............ 74/579 R |
| 6,443,033 B1 | 9/2002 | Brummer et al. |
| 6,564,675 B1 | 5/2003 | Jiang |
| 6,924,021 B1 | 8/2005 | Colegrove et al. |
| 7,000,499 B2 | 2/2006 | Valle |
| 7,013,753 B2 | 3/2006 | Valle |
| 7,070,376 B1 | 7/2006 | Toback |
| 2003/0019324 A1 * | 1/2003 | Valle ........................... 74/594.1 |
| 2003/0061900 A1 | 4/2003 | Smith |
| 2003/0087572 A1 | 5/2003 | Balthes et al. |
| 2003/0226422 A1 | 12/2003 | Valle et al. |
| 2004/0149076 A1 | 8/2004 | Yamanaka |
| 2004/0177717 A1 | 9/2004 | Chiang |
| 2005/0012298 A1 | 1/2005 | Dal Pra et al. |
| 2005/0016323 A1 | 1/2005 | Dal Pra' |
| 2007/0186719 A1 * | 8/2007 | Ciavatta et al. .............. 74/594.1 |
| 2007/0199403 A1 | 8/2007 | Ciavatta |
| 2007/0227293 A1 | 10/2007 | Valle |
| 2010/0058889 A1 | 3/2010 | Dal Prà |

FOREIGN PATENT DOCUMENTS

| | | |
|---|---|---|
| CN | 2509074 Y | 9/2002 |
| DE | 296 00 548 U1 | 2/1996 |
| DE | 29600548 U1 | 2/1996 |
| DE | 19601125 | 7/1997 |
| EP | 0177736 | 4/1986 |
| EP | 0916477 | 5/1999 |
| EP | 1 270 393 A1 | 6/2002 |
| EP | 1 281 609 A2 | 7/2002 |
| EP | 1 419 961 A1 | 11/2002 |
| EP | 1419961 A1 | 11/2002 |
| EP | 1270393 | 1/2003 |
| EP | 1270394 | 1/2003 |
| EP | 1281609 A2 | 2/2003 |
| EP | 1 486 413 A2 | 8/2003 |
| EP | 1281609 A3 | 10/2003 |
| EP | 1442974 A2 | 8/2004 |
| EP | 1486413 A2 | 12/2004 |
| FR | 2416829 | 9/1979 |
| FR | 2 636 386 | 3/1990 |
| FR | 2636386 | 3/1990 |
| FR | 2722753 | 7/1994 |
| FR | 2722753 | 1/1996 |
| JP | 57-111694 | 7/1982 |
| JP | 60-022323 | 2/1985 |
| JP | 61-066636 | 4/1986 |
| JP | 61-135801 | 6/1986 |
| JP | 61-137634 | 6/1986 |
| JP | 04-339635 | 11/1992 |
| JP | 04-347006 | 12/1992 |
| JP | 06-321167 | 11/1994 |
| JP | 10-181662 | 7/1998 |
| JP | 11-166552 | 6/1999 |
| JP | 2003-054478 | 2/2003 |
| JP | 2003-072666 | 3/2003 |
| JP | 2003-276671 | 10/2003 |
| JP | 2006-007799 | 1/2006 |
| WO | 98/57840 | 12/1998 |

OTHER PUBLICATIONS

Office Action for JP 2004-173152 issued Jan. 5, 2010.
European Search Report dated Sep. 17, 2009, European Application No. 09009916.9-1254.
European Search Report dated Oct. 15, 2009, European Application No. 09009915.1-1254.
EPO Communication dated Oct. 10, 2008.
Japanese Office Action and English translation for App. No. 2007-031919—dated Feb. 28, 2012.
Japanese Office Action and English translation for Appl. No. 2007-031919 dated Sep. 11, 2012.

* cited by examiner

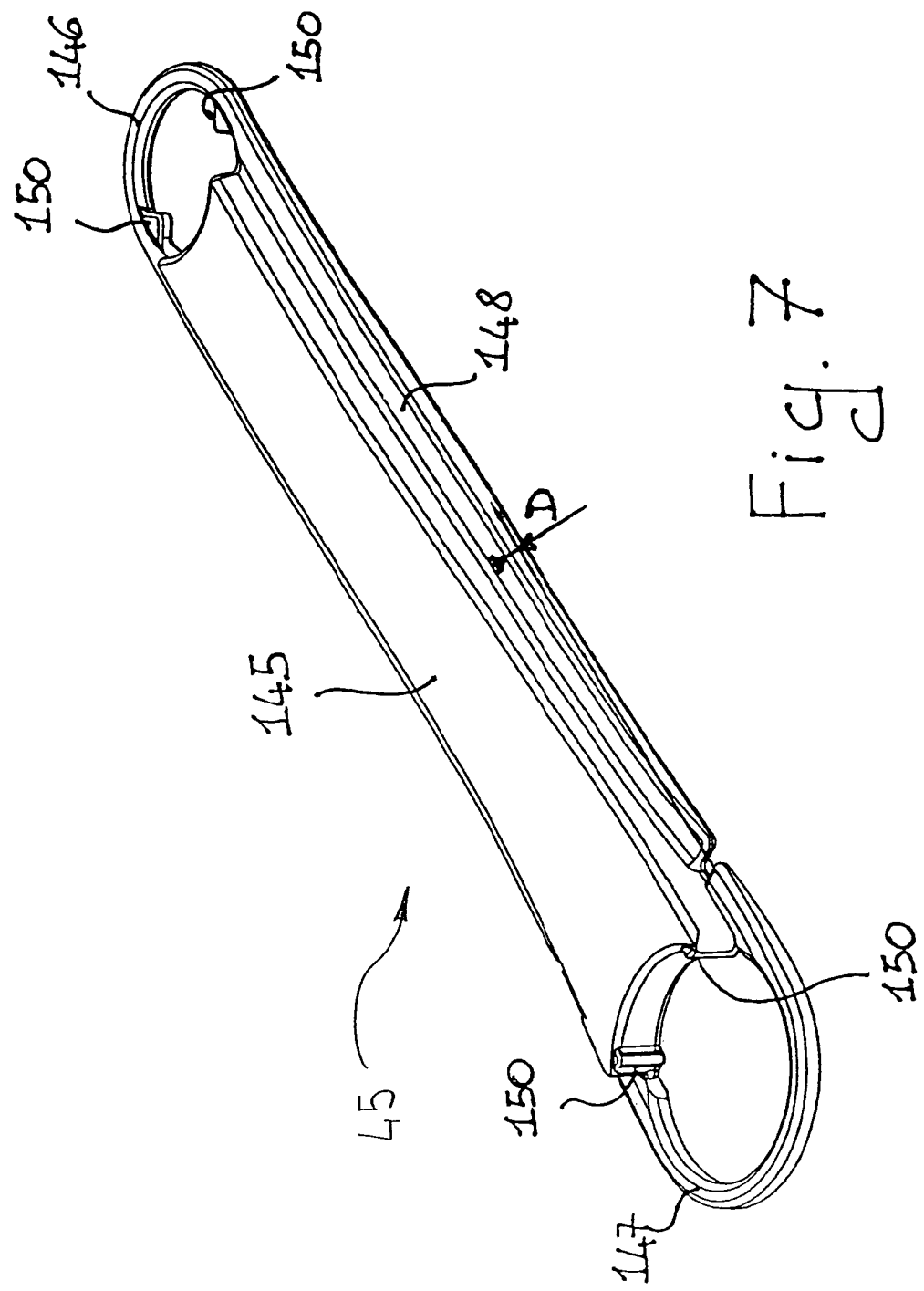

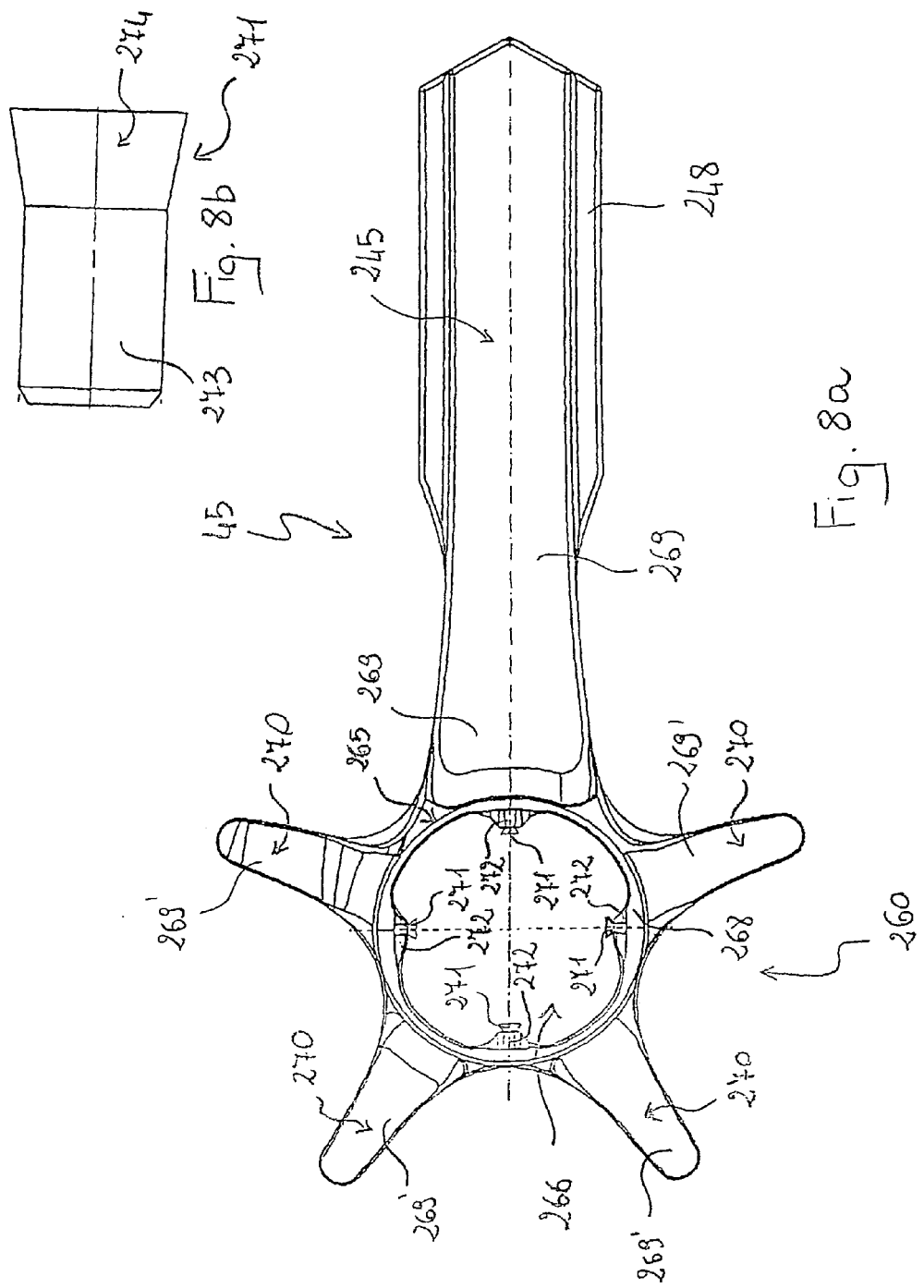

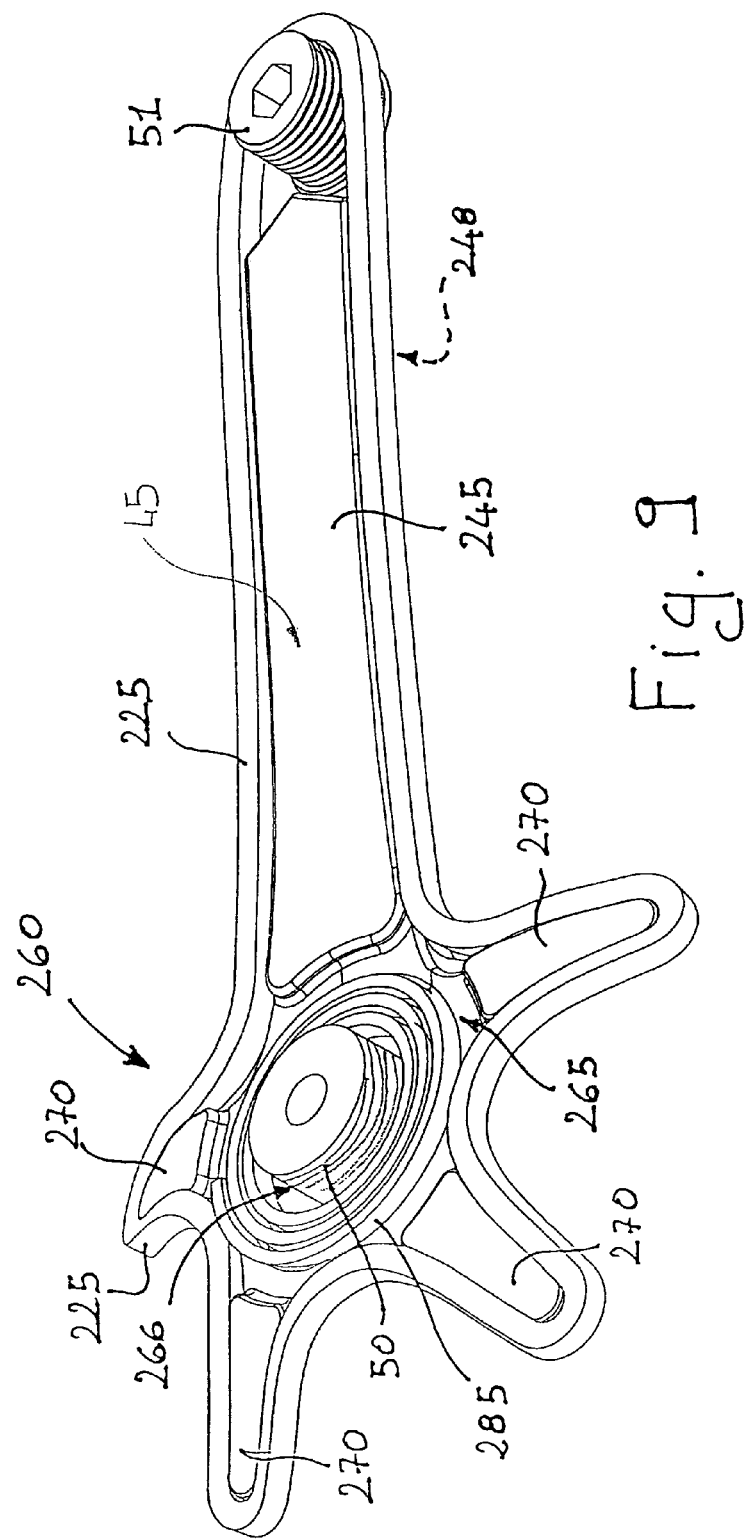

US 8,863,616 B2

BICYCLE PEDAL CRANK, INTERMEDIATE PRODUCT AND METHOD FOR MANUFACTURING SUCH A PEDAL CRANK

FIELD OF INVENTION

The present invention relates to a bicycle pedal crank.

The invention also relates to an intermediate product used to manufacture such a pedal crank and a method for manufacturing said pedal crank.

BACKGROUND

A constant requirement of manufacturers of bicycles and/or of bicycle components, above all of racing bicycles, is to reduce the overall weight of the bicycle and, therefore, of the various components of the bicycle to as low as possible, at the same time ensuring, if not even improving, the characteristics of structural strength of such components.

In order to satisfy this requirement, bicycle components, and in particular pedal cranks, have been made from composite materials comprising unidirectional continuous structural fibers, or else fibers in the form of pieces or small sheets arranged randomly and incorporated in a polymeric material. Structural fibers, indeed, substantially contribute to the structural strength of the pedal crank.

SUMMARY

The applicant has produced a bicycle pedal crank with an elongated body extending along a longitudinal axis X-X and having:

a first end portion with a first seat for coupling with a bottom bracket of a bicycle;

a second end portion comprising a second seat for coupling with a pedal;

an intermediate portion extending between said first end portion and the second end portion and having an inner portion substantially without structural strength and a first reinforcement structure;

wherein the first reinforcement structure has a tubular structure arranged around the inner portion and extending longitudinally for a part no longer than the longitudinal extension of the intermediate portion.

BRIEF DESCRIPTION OF THE DRAWING(S)

Further characteristics and advantages of the pedal crank of the present invention shall become clearer from the following description of some preferred embodiments thereof, made hereafter, for indicating and not limiting purposes, with reference to the attached drawings. In such drawings:

FIGS. 7 and 7a are perspective views of alternative embodiments of the core of FIG. 2;

FIG. 8a is a top view of a preferred embodiment of the core of FIG. 8;

FIG. 8b is a view of a detail of the core of FIG. 8a;

FIG. 9 is a perspective view that illustrates a preparation step of a preferred embodiment of an intermediate product for manufacturing a right pedal crank according to the invention;

DETAILED DESCRIPTION OF THE PREFERRED EMBODIMENT(S)

Introduction

Figure 1:
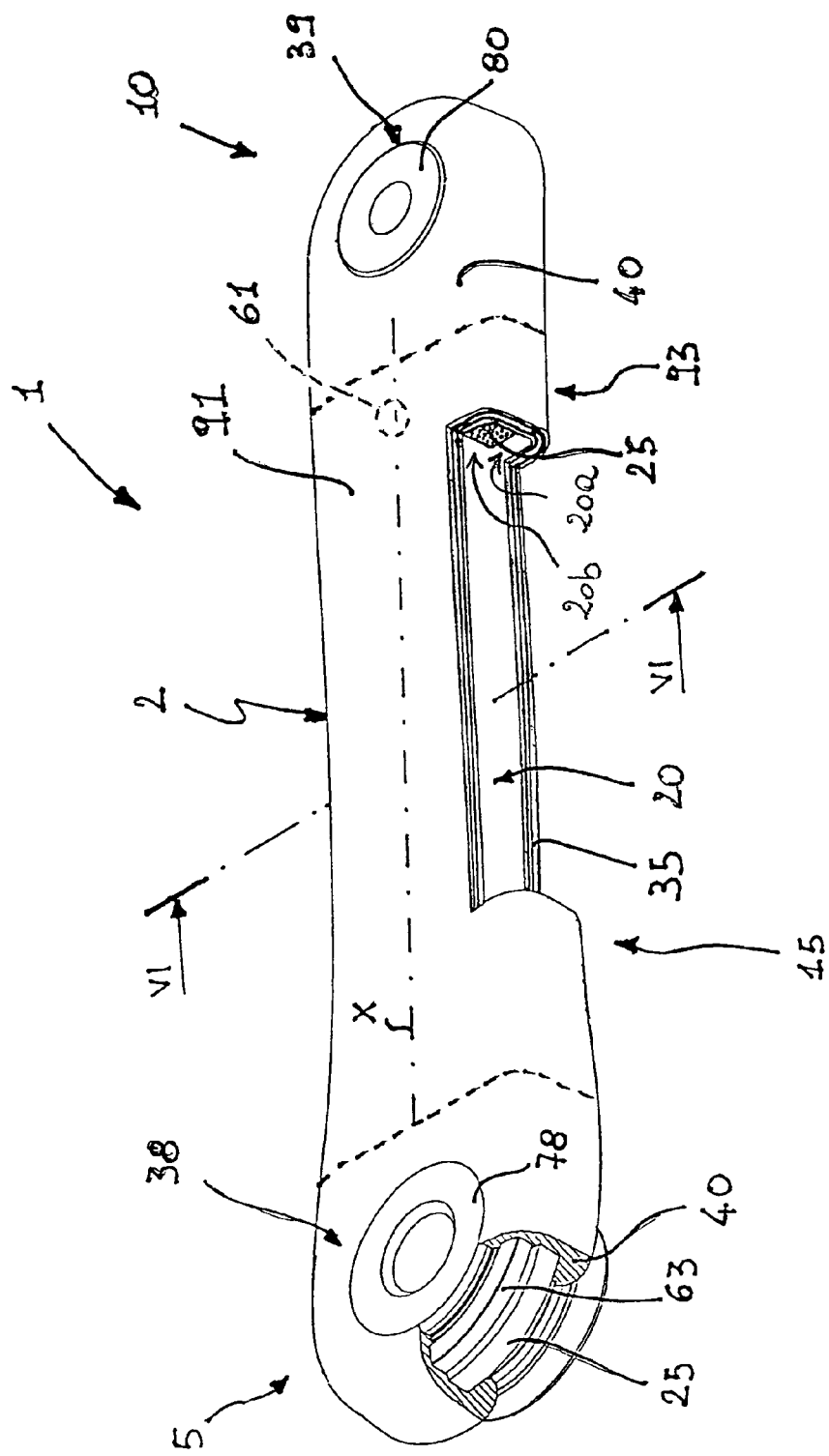
FIG. 1 is a perspective view partially in section of a left pedal crank according to the present invention.

The present invention relates, in a first aspect thereof, to a bicycle pedal crank, comprising an elongated body extending along a longitudinal axis X-X and having a first end portion comprising a first seat for coupling with a bottom bracket of the bicycle and a second end portion comprising a second seat for coupling with a pedal. An intermediate portion extends between the first end portion and the second end portion and comprises an inner portion substantially without structural strength and a first reinforcement structure. The first reinforcement structure comprises a tubular structure arranged around the inner portion and extends longitudinally for a part not longer than the longitudinal extension of the intermediate portion.

In the pedal crank of the invention the tubular structure, advantageously, on the one hand ensures uniform structural capabilities around the portion substantially without structural capability and on the other hand, extending only to the intermediate portion of the pedal crank, and therefore not involving the end portions and the respective coupling seats, allows the pedal crank to be manufactured in simple and quick way, overcoming the drawbacks discussed above with reference to the prior art. The end portions can indeed be made in a completely automated manner, for example, through a filling material molded at high pressure.

Moreover, the use of the aforementioned tubular structure contributes, during the pressure-molding of the pedal crank, to immobilize the core used to form the aforementioned inner part without structural capability, avoiding the generation, in the end product, of defects caused by possible undesired movements of the core during the molding operations.

Preferably, the tubular structure comprises at least one sheet of composite material wound around the longitudinal axis X-X. More preferably, the sheet comprises at least one layer of unidirectional continuous structural fibers incorporated in a polymeric material and having a preferential direction of extension. The continuous structural fibers advantageously ensure high structural strength.

Preferably, the aforementioned preferential direction of extension is inclined with respect to the longitudinal axis X-X by a predetermined first angle. More preferably, such a predetermined first angle is equal to about 45°. The Applicant has indeed found that this inclination is optimal to give the pedal crank characteristics of resistance to traction, bending and torsion stresses.

In a particularly preferred embodiment of the pedal crank of the present invention, in order to further increase its structural strength without negatively influencing the characteristics of lightness and easiness of manufacture discussed above, the tubular structure comprises at least two layers of composite material each comprising unidirectional continuous structural fibers having a respective preferential direction of extension.

Preferably, in this embodiment, the preferential direction of extension of a layer of composite material is inclined with respect to the preferential direction of extension of at least one other layer of composite material by a predetermined second angle. More preferably, such a predetermined second angle is equal to about 90°.

Preferably, the inner portion of the intermediate portion of the pedal crank is defined by a cavity. In alternative and less preferred embodiments, the inner portion can be made from materials without structural capability, like for example expanded polyurethane.

Preferably, the first and the second end portions of the pedal crank comprise a composite material comprising structural fibers arranged randomly and incorporated in a polymeric material. Advantageously, the structural fibers arranged randomly, for example in the form of small sheets of fabric or pieces of fiber, are able to flow when subjected to pressure in a mold and therefore to optimally fill the end areas of the cavity of the mold so as to obtain the end portions of the pedal crank. Such end portions, in any case being made from a material comprising structural fibers, have the desired characteristics of structural strength.

Preferably, the pedal crank of the present invention further comprises a second reinforcement structure defined by at least one bundle of unidirectional continuous structural fibers that extends longitudinally in the elongated body. Preferably, the second reinforcement structure winds in a loop around the first and second end portions and the intermediate portion. More preferably, the second reinforcement structure is arranged, at the intermediate portion, between the inner portion and the first reinforcement structure. Advantageously, the bundle of longitudinal continuous structural fibers gives the pedal crank a high resistance to traction loads.

Preferably, the structural fibers in the composite material, be they continuous or in pieces arranged randomly, are selected from the group comprising: carbon fibers, glass fibers, aramidic fibers, boron fibers, ceramic fibers and combinations thereof, carbon fibers being most preferred.

Preferably, the polymeric material in the composite material is a thermosetting material. More preferably the thermosetting material comprises an epoxy resin. However, the possibility of using a thermoplastic material is not excluded.

In a particularly preferred embodiment of the pedal crank of the present invention, the intermediate portion of the pedal crank has a section perpendicular to the longitudinal axis X-X in which the aforementioned inner portion occupies a space defined by a first area having a first surface extension and by a second area having a second surface extension and in which the second reinforcement structure occupies a space having a surface extension equal to the difference between the first and second areas. Advantageously, such a pedal crank has an optimal compromise between lightness and structural strength. Indeed, the second reinforcement structure is arranged only at the areas of the pedal crank most stressed in operation, the other areas being hollow or made from material without structural capability.

In particular, preferably, the second reinforcement structure is arranged, in the intermediate portion of the pedal crank, in such a way that each surface portion thereof that faces the first reinforcement structure is opposite a respective surface portion of the second reinforcement structure that faces the inner portion of the pedal crank. In this way, when a stress is transmitted from the first reinforcement structure to the second reinforcement structure through their mutual contact surfaces, the second reinforcement structure is free to deform at its surface facing the inner portion of the pedal crank. Indeed, since the inner portion of the pedal crank does not have structural capability, at the interface surface between the second reinforcement structure and the inner portion no constraint tension is generated that, acting in contrast to the deformation stress of the second reinforcement structure, would cause the detachment of the second reinforcement structure from the first reinforcement structure. Advantageously, in the case in which the inner portion is defined by a cavity, the constraint tensions are completely zero.

Preferably, the fibers of the second reinforcement structure are unidirectional continuous structural fibers extending, at the intermediate portion of the pedal crank, substantially parallel to the longitudinal axis X-X.

In a particularly preferred embodiment of the pedal crank of the present invention, at least one of the two end portions of the pedal crank comprises a second cavity extending around the respective coupling seat. Advantageously, the presence of cavities also at the end portions of the pedal crank allows the overall weight of the pedal crank to be decreased.

Preferably, an insert adapted to allow the coupling of the pedal crank with the bottom bracket of the bicycle or with a pedal is inserted into the coupling seat.

Preferably, the second cavity is a prolongation of the first cavity formed at the inner portion of the intermediate portion of the pedal crank. Nevertheless, it is not excluded that the cavity formed in the end portion of the pedal crank and the cavity formed in the intermediate portion of the pedal crank can be distinct and separate.

Preferably, the second cavity has a height at least in part shorter than the height of the first cavity, so that the pedal crank, at the coupling areas with the bottom bracket and with the pedal, has areas of increased thickness suitable for ensuring the desired structural strength.

Nevertheless, alternative embodiments are not excluded in which the second cavity has a height equal to that of the first cavity, or to that of the insert inserted into the respective coupling seat formed in the end portion of the pedal crank.

In a specific embodiment of the pedal crank of the present invention, the first and the second end portions both comprise a respective second cavity extending around the respective coupling seat.

The pedal crank of the present invention can be either a left pedal crank or a right pedal crank.

Preferably, in the case of a left pedal crank, the elongated body of the pedal crank has a first face intended to face a bicycle frame and a second face opposite the first face and the second reinforcement structure is arranged in such a way that, at the first end portion of the pedal crank, it is closer to the first face than to the second face. Advantageously, the pedal crank of the present invention is thus a hollow pedal crank, i.e. light, in which the second reinforcement structure is arranged at the part of the pedal crank most stressed in operation, which indeed is that located at the coupling area with the bottom bracket, at the side facing towards the bicycle frame.

Preferably, in the case of a left pedal crank, the elongated body of the pedal crank also comprises, at least one of its end portions, at least one holding element of a portion of the aforementioned second reinforcement structure. Advantageously, such a holding element, during the molding process of the pedal crank, contributes to keep tensioned and in position the fibers of the second reinforcement structure at the end portions of the pedal crank. Therefore, it is ensured that there are structural fibers present at the areas of the pedal crank most stressed during pedalling, between which there is in particular the end portion of the pedal crank for coupling with the bottom bracket of the bicycle. Even more advantageously, the holding element ensures that, during molding, due to the flowing of the filling material the fibers do not shrivel in the end portions of the pedal crank. The Applicant has indeed found that the structural fibers, if bent excessively, can break. A possible shrivelling would thus generate weakening points in the structure of the body of the pedal crank.

Preferably, the at least one holding element has a lower thickness at an outer surface portion thereof facing the inner portion of the intermediate portion of the pedal crank. Advantageously, this allows the core intended to form the lightened inner portion of the pedal crank to be brought closer towards the end area of the pedal crank itself and therefore allows a pedal crank to be obtained in which the lightened inner portion has greater longitudinal extension.

For example, the holding element can be defined by a ring nut adapted to be screwed into an outer threading formed on a forming element of the end portion of the pedal crank, but any other type of coupling is not excluded.

Preferably, the holding element, given that it is intended to remain imprisoned in the finished pedal crank, is made from a light material, like a composite material or a metal alloy. The weight of the pedal crank thus remains low.

More preferably, the holding element is made from phenolic resin loaded with glass fiber, the content of the glass fibers preferably being equal to 40-50%. The Applicant has found that a holding element thus made gives excellent performance results combined with a particularly low cost.

On the other hand, in the case of a right pedal crank, it preferably comprises, at the end portion for coupling with the bottom bracket of the bicycle, a plurality of spokes. Such spokes, preferably, comprise respective cavities that branch from the second cavity formed around the coupling seat provided in the end portion of the pedal crank. A particularly light right pedal crank is thus obtained.

Preferably, in the case of a right pedal crank the elongated body of the pedal crank has a first face intended to face the bicycle frame and a second face opposite the first face and the second reinforcement structure is arranged in the elongated body so as to be closer to the second face. The right pedal crank of the present invention is therefore a hollow pedal crank, and therefore light, in which the reinforcement structure is arranged in the area of the pedal crank most stressed in operation, which is indeed the face of the pedal crank facing outwards.

Preferably, the bundle of unidirectional fibers that constitutes the second reinforcement structure of the intermediate portion of the pedal crank extends along the spokes and follows the profile thereof, so as to ensure that the pedal crank has structural strength also at the spokes.

Preferably, the height of the cavities of the spokes is greater than that of the cavity around the coupling seat formed in the end portion of the pedal crank. A thickened area around the seat for coupling with the bottom bracket is thus obtained in the pedal crank; such thickening ensures the desired characteristics of structural strength in this area of the pedal crank that is particularly stressed during pedalling. Such an area, in particular, is the area for coupling with the bottom bracket, on the side facing outwards.

Preferably, the pedal crank of the present invention comprises a layer of continuous structural fibers wound in a spiral around the coupling seat. This is to enhance the characteristics of resistance to stress of the pedal crank at the aforementioned area for coupling with the bottom bracket.

In a second aspect thereof, the present invention relates to an intermediate product for manufacturing a bicycle pedal crank, such an intermediate product comprising a core having an elongated body extending along a longitudinal axis X-X and a sheet of composite material wound around the core and the longitudinal axis X-X and comprising at least one layer of structural fibers, the sheet extending longitudinally for a part not longer than the longitudinal extension of the core.

Advantageously, the intermediate product described above can be used to manufacture the pedal crank of the present invention, and thus allows the aforementioned advantages with reference to such a pedal crank to be achieved.

Preferably, the intermediate product of the present invention comprises singularly and/or in combination all of the preferred structural characteristics described above with reference to the pedal crank and correlated to the presence, composition and arrangement of unidirectional structural fibers incorporated in a composite material, possibly a filling material.

Preferably, as already stated with reference to the pedal crank of the present invention, the sheet of composite material comprises at least one layer of unidirectional continuous structural fibers incorporated in a polymeric material. Such a sheet of composite material constitutes the aforementioned first reinforcement structure with reference to the pedal crank of the present invention.

More preferably, the aforementioned intermediate product also comprises at least one bundle of unidirectional continuous structural fibers arranged between the core and the aforementioned sheet of composite material. Such a bundle of unidirectional continuous structural fibers constitutes the second reinforcement structure mentioned above with reference to the pedal crank of the present invention.

Even more preferably, the aforementioned intermediate product also comprises at least one first layer of filling material capable of flowing under pressure and arranged between the core and the sheet of composite material. More preferably, at least one second layer of filling material is associated with the sheet at the outer end thereof. Such a filling material is adapted to form the end portions of the pedal crank following a pressure molding operation of the intermediate product thus arranged.

In the preferred embodiment thereof, in the intermediate product of the present invention the fibers of the sheet of composite material have at least in part a first orientation and the fibers of the bundle of fibers have at least in part a second orientation different to the first orientation and the bundle of fibers is arranged in such a way that each surface portion of such a bundle of fibers that faces the sheet of composite material is opposite a respective surface portion of the bundle of fibers that faces the core.

Preferably, the fibers of the bundle of fibers are unidirectional continuous structural fibers extending substantially parallel to the longitudinal axis X-X and the fibers of the sheet of composite material are unidirectional continuous structural fibers extending substantially along at least one direction inclined, preferably by about 45°, with respect to the longitudinal axis X-X.

Preferably, the elongated body of the core comprises opposite longitudinal sides provided with respective housing seats of respective portions of the fibers of the bundle of fibers.

Preferably, each housing seat is defined by a side surface of the elongated body of the core and by a projecting surface that projects laterally from the side surface. Advantageously, such a projecting surface, when the intermediate product is inserted in the cavity of the mold to manufacture the pedal crank, is arranged so as to be arranged between the pressure element of the mold and a portion of the reinforcement structure defined by the aforementioned bundle of fibers so that, when the pressure element is actuated, the projecting surface exerts a uniform pressure on such a portion of reinforcement structure keeping tensioned the fibers of the structure and thus avoiding that they shrivel due to the effect of the flowing of the filling material.

This is particularly advantageous if the bundle of fibers also embraces two forming elements (typically consisting of metallic inserts having an outer threading) of the end portions of the pedal crank. The tension generated by the thrust of the aforementioned projecting surface of the core indeed prevents the flowing of the filling material on two opposite sides of the aforementioned forming elements from causing a shrivelling of the fibers of the reinforcement structure at the forming elements, such shrivelling generating weakening points in the finished pedal crank.

Preferably, a holding element of a respective portion of the reinforcement structure defined by the aforementioned bundle of fibers is arranged on at least one of the aforementioned two forming elements. More preferably, the holding element is arranged on the opposite side to the projecting surface of the core with respect to the bundle of fibers, so that, when the projecting surface of the core exerts the thrust on the respective portion of the bundle of fibers the holding element supports a second portion of such a bundle of fibers in the opposite direction to that of the thrust.

Preferably, the core is made from a metallic material having a low melting point to allow it to be removed by melting when the pedal crank has been made. The material having a low melting point is in particular a material capable of melting at a temperature slightly greater than the cross-linking temperature of the composite material. In this way the core allows very high pressures to be applied that optimally compact the composite material and the filling material, inducing an intense degasification.

Preferably, in the case in which one wishes to manufacture a pedal crank having a cavity around the seats for coupling with the bottom bracket and/or with the pedal, the core comprises a central body portion and two rings integrally associated with the elongated body at opposite ends of the central body portion. The two rings create the cavities in the end portions of the pedal crank whereas the central body portion of the core creates the cavity at the intermediate body portion of the pedal crank.

Preferably, a ring of the pair of rings has a height at least in part shorter than the height of the central body portion. Such a ring of lesser height is adapted to create the cavity at the end portion for coupling with the bottom bracket of the bicycle. Advantageously, the fact that such a ring has a height shorter than that of the central body portion of the core makes it possible to not exert a pressure on the portion of the bundle of structural fibers supported by the holding element during the molding of the pedal crank, thus ensuring a correct tensioning of such fibers.

Preferably, at least part of the ring has a height shorter than the height of the projecting surface of the central body portion of the core. The ring can also have at least one body portion having a height greater than the remaining body portion.

The other ring of the pair of rings can have a height substantially equal to the height of the projecting surface or equal to that of the other ring.

Preferably, the aforementioned rings comprise respective positioning elements extending towards the inside of the rings. Advantageously, such positioning elements, pressing against the forming inserts of the end portions of the pedal crank in the molding step, prevent the core from moving.

In a preferred embodiment thereof, the core comprises, at one of the two rings, a central hole and a plurality of spokes that extend radially outwards from the central hole. Such a core is advantageously used in the manufacture of a right pedal crank, where the spokes of the pedal crank are used to support the front gear wheels of the bicycle.

Preferably, the spokes of the core have a height greater than the height of the ring at the central hole. Advantageously, the pedal crank obtained using such a core therefore comprises, around the seat for coupling with the bottom bracket of the bicycle, a thickened area that ensures a high structural strength in an area where there is notoriously a high concentration of tensions.

Preferably, a layer of continuous structural fibers is wound in a spiral around the central hole. More preferably, the aforementioned bundle of structural fibers extends along the spokes, following the profile thereof. The structural strength of the finished pedal crank is thus increased at the spokes.

Preferably, in the case in which one wishes to manufacture a right pedal crank, the projecting surface defined on the sides of the elongated body of the core extends parallel to the axis X-X for a part having a length shorter than the length of the central body portion of the core. This promotes a thickening of the body of the pedal crank at the joining area between the intermediate portion and the end portion for coupling with the bottom bracket of the bicycle, i.e. where there is notoriously a high concentration of tensions.

In a third aspect thereof, the present invention relates to a method for manufacturing a bicycle pedal crank, comprising the steps of providing a core adapted to define an inner portion substantially without structural strength of a pedal crank, the core comprising an elongated body extending along a longitudinal axis X-X, and providing two forming elements of opposite end portions of the pedal crank. An intermediate product is provided by axially winding a first reinforcement structure comprising at least one layer of unidirectional continuous structural fibers around the core. The intermediate product is inserted into a cavity of a mold together with the two forming elements and with at least one mass of filling material comprising a polymeric material and capable of flowing under pressure, the mold being equipped with a pressure element and the cavity having the shape of the pedal crank. A predetermined pressure is applied to the pressure element to make the filling material flow into the cavity. The method further comprises the steps of heating the mold to a temperature corresponding to the cross-linking temperature of the polymeric material and opening the mold and removing the formed pedal crank.

Through this method it is advantageously possible to manufacture the pedal crank of the invention in a simple and cost-effective manner. The need for intervention of an operator is indeed limited and many steps of the aforementioned method are completely automated. Moreover, possible movements of the core during pressure molding are substantially prevented by the presence of the layer of composite material wound around the core, which is intended to form the tubular structure described above with reference to the pedal crank of the present invention.

Preferably, the step of providing an intermediate product comprises the step of winding at least one bundle of unidirectional continuous structural fibers in a loop around the two forming elements and the core.

Preferably, the core consists of a metallic material having a low melting point and the method of the present invention also comprises, after the heating step of the mold, the steps of forming at least one hole on a surface of the pedal crank, and heating the pedal crank up to the melting point of the metallic material having a low melting point to allow it to flow out.

In this way, advantageously, a cavity is obtained at the space occupied by the core thus obtaining a pedal crank having the desired characteristics of lightness.

Preferably, the melting point of the material having low melting point is higher than the cross-linking temperature of the polymeric material in the composite material by a value $\Delta T$ of between about 1° C. and about 25° C., more preferably about 5° C.

Preferably, the unidirectional continuous structural fibers of the first reinforcement structure extend along a preferential direction of extension and the step of providing the intermediate product comprises the step of arranging the at least one layer of structural fibers so that the preferential direction of extension is inclined with respect to the longitudinal axis X-X by a predetermined angle, preferably equal to about 45°.

Preferably, the method further comprises, before the step of insertion of the intermediate product and of the mass of filling material in the cavity of the mold or after the aforementioned insertion step and before the step of application of the predetermined pressure, the step of preheating the intermediate product and the at least one mass of filling material bringing it to a predetermined preheating temperature for a predetermined preheating time. This preheating step is used to make the composite material of the first reinforcement structure and possibly of the layer of structural fibers that wind in a loop around the core and the aforementioned forming elements more easily malleable during molding and the filling material more easily capable of flowing under pressure.

The parameters of the preheating step are selected so as to achieve homogeneous heating without the polymeric components aging excessively. A first preferred range of values is given by a temperature of between about 60° C. and about 100° C., which is maintained for a time of between about 5 and about 70 minutes. An even more preferred range of values is given by a temperature of between about 80° C. and about 100° C. which is maintained for a time of between about 5 and about 60 minutes. A particularly preferred range of values is given by a temperature of between about 85° C. and about 90° C. maintained for a time of between about 35 and about 55 minutes. In this way it is possible to serve a mold with a limited number of preheating ovens.

Preferably, the step of inserting the intermediate product into the cavity of the mold together with the at least one mass of filling material comprises the step of providing at least one first layer of filling material between the core and the layer of composite material axially wound around the core.

More preferably, at least one second layer of filling material is also inserted outside of the layer of composite material wound axially around the core.

In this way it is possible to obtain an optimal distribution of the filling material in the cavity of the mold and therefore a high-quality end product both in terms of structure and appearance.

Preferably, the aforementioned filling material is a composite material comprising portions of structural fibers, preferably pieces or small sheets of fibers arranged randomly and incorporated in a polymeric material.

Preferably, the predetermined pressure exerted by the pressure element during the molding of the pedal crank is between about 5 bar and 400 bar, more preferably between 40 and 300 bar and even more preferably between 200 and 300 bar.

The structural fibers, continuous or in pieces, and the polymeric material of the composite material are selected as described above with reference to the pedal crank of the present invention.

Preferably, the aforementioned bundle of fibers is housed in a pair of housing seats formed on opposite longitudinal sides of the core, in which each housing seat is defined by a side surface of the core and by a projecting surface that projects laterally from the side surface.

More preferably, the intermediate product is inserted into the cavity of the mold so that the pressure element acts upon a first portion of the aforementioned bundle of fibers through the aforementioned projecting surface.

Even more preferably, the method of the present invention further comprises the step of providing a holding element of a second portion of the aforementioned bundle of fibers on at least one of the forming elements so that such a holding element acts upon the bundle of fibers on the opposite side to the aforementioned projecting surface.

DETAILED DESCRIPTION

With reference to FIG. 1, a bicycle pedal crank, in particular a left pedal crank, in accordance with the invention is wholly indicated with 1.

The pedal crank 1 comprises an elongated body 2 extending along a longitudinal axis X-X and has a first end portion 5 comprising a first seat 38 for coupling with a bottom bracket (not shown) of the bicycle, a second end portion 10 comprising a second seat 39 for coupling with a pedal (not shown), and an intermediate portion 15 extending between such end portions 5, 10. On the pedal crank 1 a front face 91, which, in conditions of assembly onto the bicycle, faces towards the frame of the bicycle, and a rear face 93, which, in conditions of assembly onto the bicycle, faces outwards are identified.

The elongated body 2 is made in a single piece of composite material, comprising structural fibers incorporated in a polymeric material. Typically, the structural fibers are selected from the group consisting of carbon fibers, glass fibers, aramidic fibers, ceramic fibers, boron fibers and combinations thereof, carbon fibers being preferred. The polymeric material is typically a thermosetting material, preferably comprising an epoxy resin. However, the possibility of using a thermoplastic material is not excluded.

The structural fibers are suitably arranged inside the elongated body 2, so as to form different structures that react to different types of stresses.

In particular, the intermediate portion 15 comprises an inner portion substantially without structural strength and an outer reinforcement structure. In the illustrated preferred embodiment, the inner portion consists of a cavity 20.

The outer reinforcement structure comprises a tubular structure 35, arranged around the cavity 20 and extending longitudinally not longer than the longitudinal extension of the intermediate portion 15 (approximately defined in FIG. 1 by the two broken lines), and preferably equal to such an extension. In no case does the tubular structure 35 reach the coupling seats 38, 39.

The function of the tubular structure 35 is essentially to provide adequate resistance to bending and torsion stresses.

Figure 3:
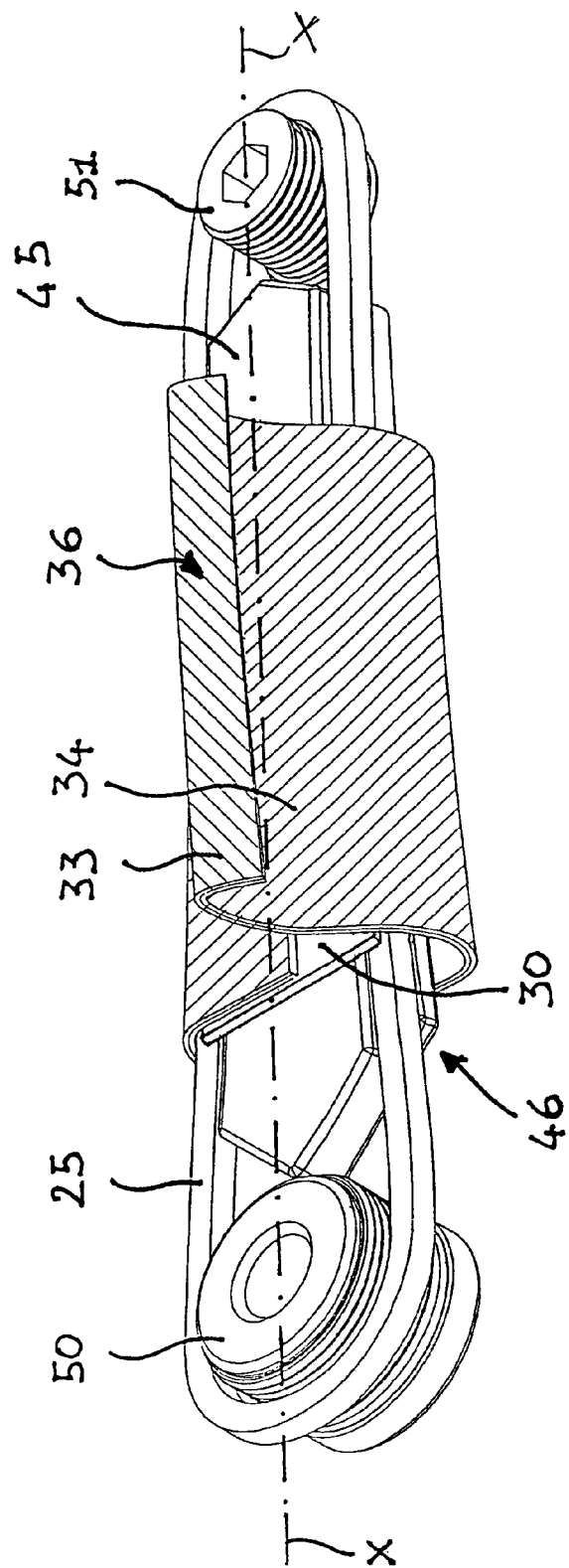
FIG. 3 is a perspective view that illustrates a preparation step of a preferred embodiment of an intermediate product for manufacturing the pedal crank of FIG. 1.

The tubular structure 35 has at least one sheet 36 of composite material wound many times around the longitudinal axis X-X, as made clearer hereafter with reference to the method for manufacturing the pedal crank 1. In the preferred embodiment illustrated here, the sheet 36 comprises two layers 33, 34 of unidirectional continuous structural fibers having a respective preferential direction of extension inclined with respect to the longitudinal axis X-X (FIG. 3). It has been observed that, to ensure optimal resistance to torsion and bending stresses, it is preferable that the preferential direction of extension of the structural fibers of one layer be inclined with respect to the preferential direction of extension of the structural fibers of the other layer by about 90° and that such preferential directions of extension be both inclined by about 45° with respect to the longitudinal axis X-X.

The elongated body 2 preferably also comprises an intermediate reinforcement structure. In the preferred embodiments described here, such an intermediate reinforcement structure has a bundle 25 of unidirectional continuous structural fibers that extends longitudinally in the elongated body 2, winding in a loop around the end portions 5, 10 and the intermediate portion 15. The bundle 25 thus arranged essentially has the function of resisting the traction loads.

At the intermediate portion 15, the bundle 25 crosses the cavity 20 twice and is arranged between it and the tubular structure 35.

Figure 6:
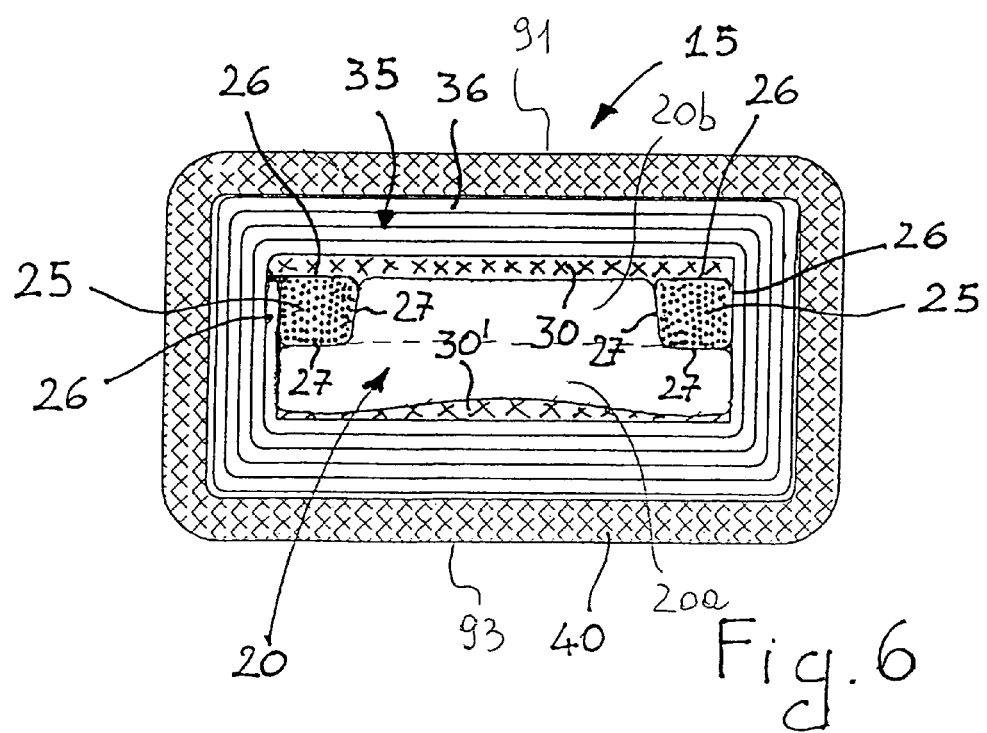
FIG. 6 is a cross section view along the line VI-VI of the pedal crank of FIG. 1.

What has been described can be seen in detail in the cross section of the intermediate portion 15 shown in FIG. 6. Going from the inside towards the outside, the cavity 20 and the intermediate reinforcement structure, which in this cross section comprises two branches of the bundle 25 and is arranged, with respect to the cavity 20, closer to the front face 91 of the pedal crank 1 are encountered first.

The two branches of the bundle 25 have a substantially rectangular section with a height preferably equal to about half the height of the cavity 20. In particular, the cavity 20 occupies a space defined by a first bottom area 20a having a certain surface extension and by a second top area 20b having a smaller surface extension (in FIG. 4 such areas are separated by a broken separation line) and the two branches of the bundle 25 occupy a space having a surface extension equal to the difference of the areas 20a, 20b.

In general, the section of the two branches of the bundle 25 can be varied; nevertheless, it is important that each portion of the surfaces 26 of each branch that faces the outer reinforcement structure, however it is configured, is opposite a respective surface portion 27 facing the cavity 20, or rather, in general, facing the inner portion substantially without structural strength of the intermediate portion 15.

Preferably, the intermediate portion 15 has a substantially rectangular section and the start and end of the sheet 36 wound to form the tubular structure 35 are arranged at a central area of one of the sides of the section, unlike what is illustrated. The Applicant has indeed found that the corners of the section are points of concentration of the tensions and has thought to position the start and the end of the sheet 36 far from these corners to avoid possible starts of fractures.

Going towards the outside layers 30 and 30' of filling material at the interface between cavity 20 and tubular structure 35, preferably, a layer of filling material is also provided at the interface between cavity 20 and intermediate reinforcement structure 25 and between intermediate reinforcement structure and tubular structure 35, so that the bundle 25 is in contact with the filling material and not with the tubular structure. Furthest towards the outside there is finally a layer 40 of filling material, which ensures uniformity of the outer surface of the pedal crank 1.

The aforementioned filling material is preferably a composite material comprising structural fibers with random distribution, for example in the form of pieces of fiber or small sheets of fabric, incorporated in polymeric material, as described in patent application US 2005/0012298 to the same Applicant, incorporated herein for reference as if fully set forth. The filling material must in any case have the characteristic of flowing under pressure, so as to be able to reach all of the desired points of the pedal crank 1 during its manufacture through molding, as shall be described in detail hereafter.

The same filling material preferably also forms the end portions 5, 10.

As an alternative to what has been stated above, the bundle 25 can be arranged outside the tubular structure 35, or incorporated between its spirals.

In an alternative preferred embodiment (not illustrated) the cavity 20 also extends at one or both of the end portions 5, 10, embracing the coupling seats 38, 39. The height of the cavity 20 at the end portions 5, 10 can be equal to or less than its height at the intermediate portion 15. The difference in height can also involve just a sector of the end portions 5, 10. In the case in which the height is less, at the end portions 5, 10 the cavity 20 is defined closer to the rear face 93 of the pedal crank 1.

In alternative embodiments it is also possible to foresee respective cavities not communicating with the cavity 20 at one or both of the end portions 5, 10.

Figure 4:
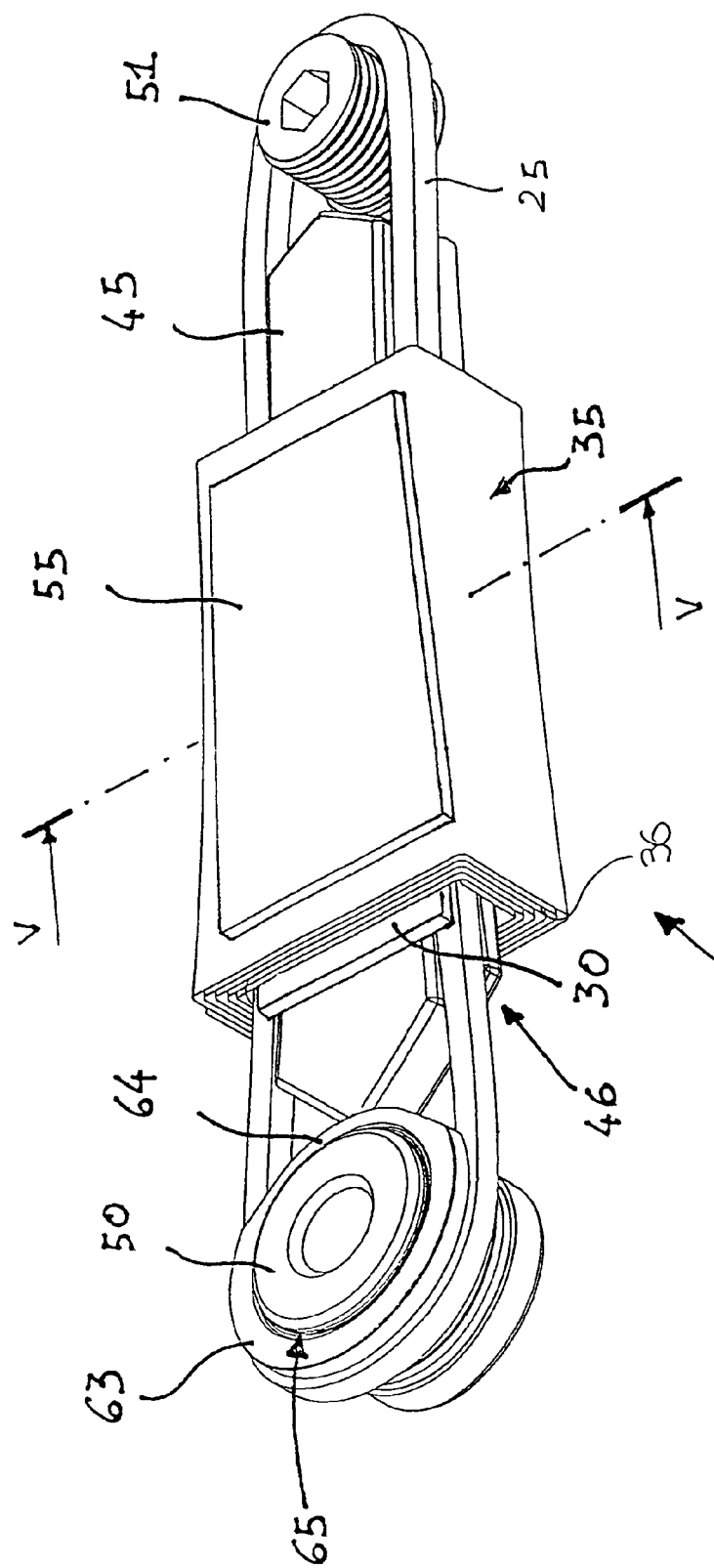
FIG. 4 is a perspective view of a preferred embodiment of an intermediate product for manufacturing the pedal crank of FIG. 1.
Figure 5:
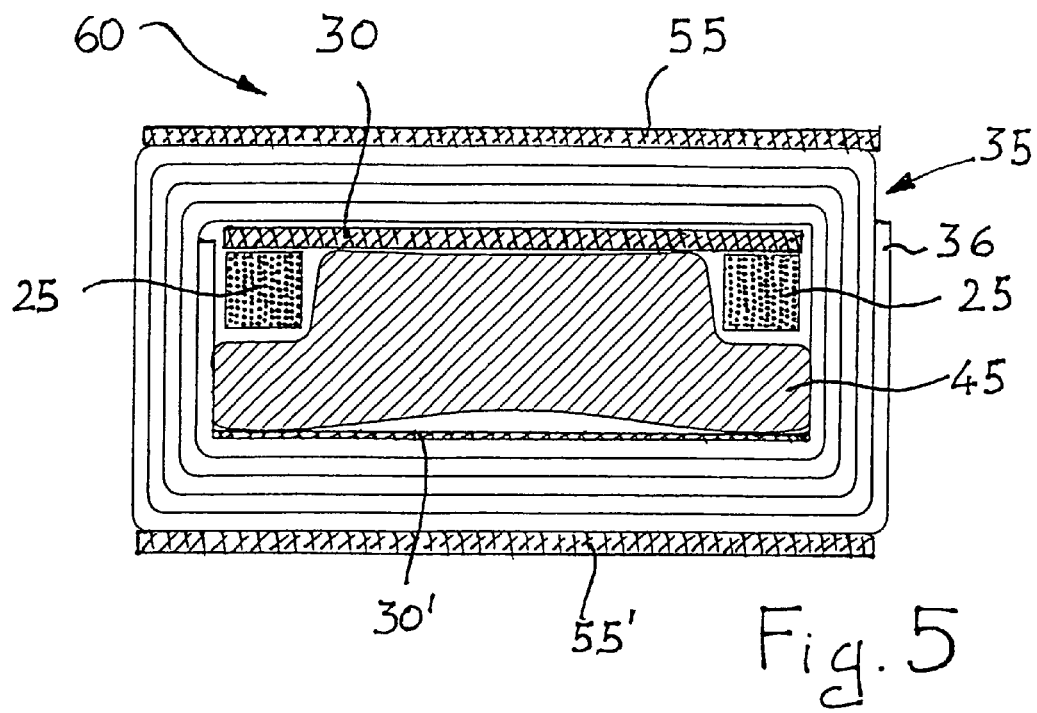
FIG. 5 is a cross section view along the line V-V of the intermediate product of FIG. 4.

FIGS. 4 and 5 show a preferred embodiment of an intermediate product 60 that can be used to manufacture the pedal crank 1.

The intermediate product 60 comprises a core 45, the bundle 25 of unidirectional continuous structural fibers that extends longitudinally around the core 45, the tubular structure 35 with the at least one sheet 36 of composite material wound axially many times around the core 45 and the bundle 25, the two layers of filling material 30,30' (only one of which can be seen in FIG. 4) arranged between each face of the core 45 and the tubular structure 35 and other two layers of filling material 55 and 55' applied to the outside of the tubular structure 35 (only one of which can be seen in FIG. 4). Two forming elements 50 and 51 of the opposite ends of the pedal crank are arranged on longitudinally opposite sides of the core 45 in such a way that the bundle 25 winds in a loop around the forming elements 50, 51 and the core 45.

Figure 2:
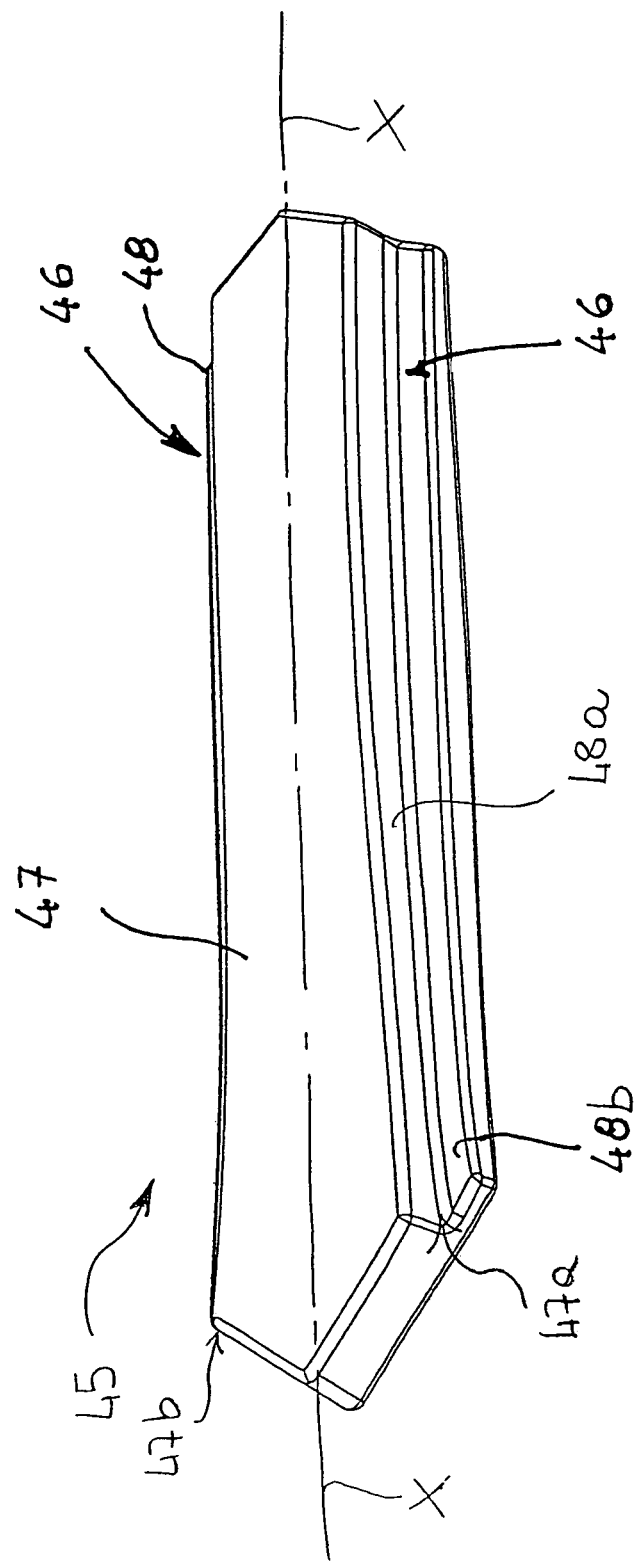
FIG. 2 is a perspective view of a core for manufacturing the pedal crank of FIG. 1.

The core 45 (FIG. 2) has an elongated body 47 having a longitudinal axis adapted to define the longitudinal axis X-X in the finished pedal crank 1. The elongated body 47, at two opposite longitudinal sides 47a, 47b, comprises respective housing seats 46 adapted to receive the two branches of the bundle 25. The housing seats 46 are defined by a side surface 48a of the elongated body 47 and by a projecting surface 48b that projects laterally from such a side surface 48a. The projecting surface 48b preferably has a height equal to about half the height of the elongated body 47.

Figure 7A:
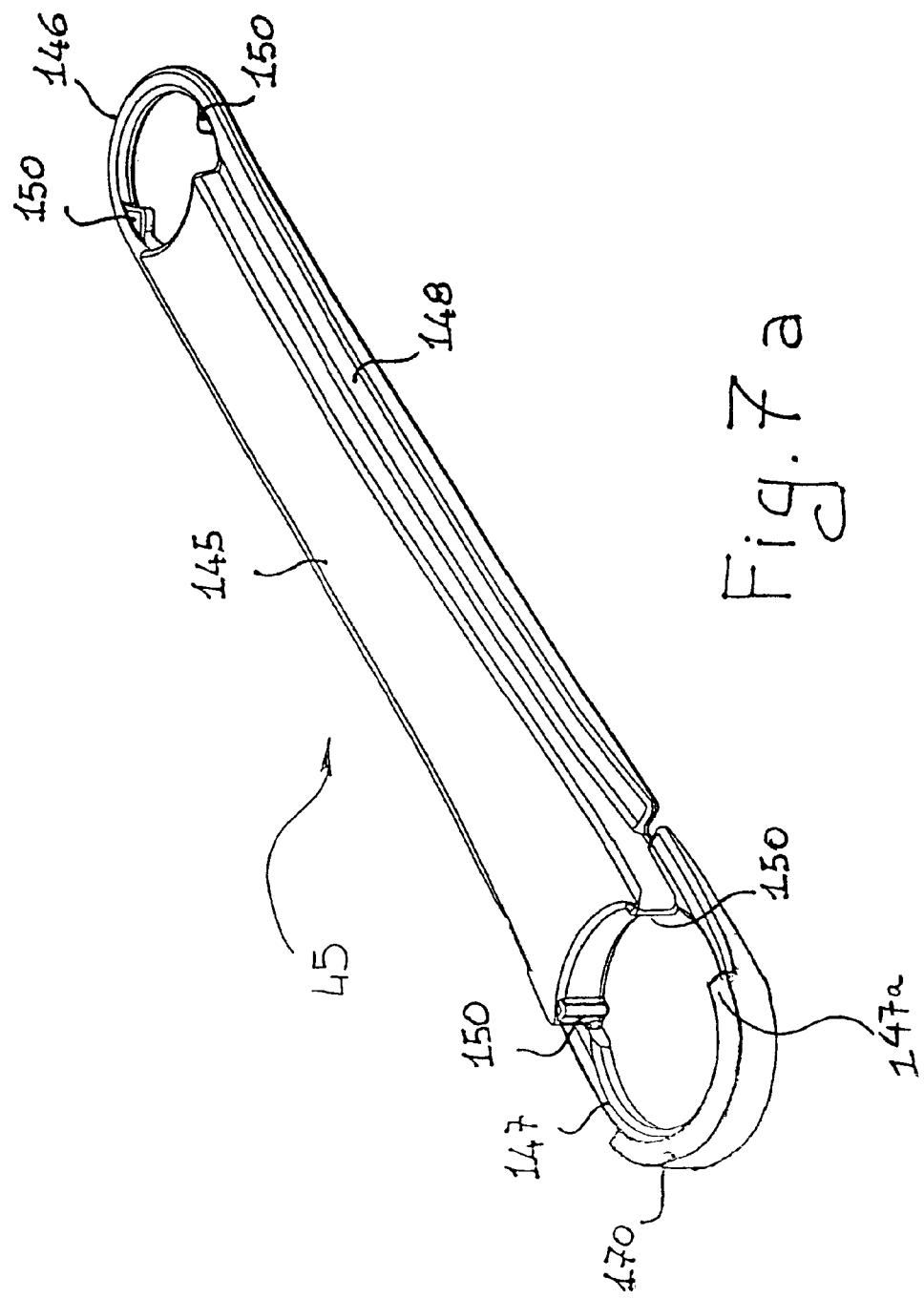

FIGS. 7 and 7a illustrate alternative embodiments of the core 45, particularly suitable for manufacturing a pedal crank 1 in which the cavity 20 also extends at the end portions 5, 10. In these embodiments the core 45 comprises a central elongated body 145 and two rings 146 and 147 connected thereto at the opposite longitudinal ends thereof. Such rings are adapted to surround the forming elements 50, 51 and thus to form cavities around the coupling seats 38, 39 in the finished pedal crank.

The elongated body 145, like the elongated body 47 in the embodiment described above, comprises, at the two opposite longitudinal sides thereof, respective projecting surfaces 148 that project laterally.

The rings 146, 147 preferably have at least in part a height shorter than the height of the central body 145, so as not to compress the bundle 25 wound around the forming elements 50, 51 during the molding operations.

The height of the rings 146, 147 can be the same as the height of the projecting surfaces 148 or different. In the embodiment of FIG. 7, in particular, the ring 146, adapted to form a cavity around the seat 39 for coupling with the pedal lies on the same longitudinal plane as the projecting surface 148, whereas the ring 147 adapted to form a cavity around the seat 38 for coupling with the bottom bracket, lies on a plane parallel to that of the projecting surface 148, but offset by a distance D.

FIG. 7a, on the other hand, shows an embodiment in which the ring 147 has a portion 147a of different thickness, and in particular greater thickness, with respect to that of the remaining portion of the ring 147. A similar configuration could also be present in the ring 146.

One or both of the rings 146, 147 can comprise positioning elements, which, pressing against the forming elements 50, 51 in the molding step, prevent the core 45 from moving. In the embodiments illustrated here the positioning elements consist of a pair of small teeth 150 extending radially towards the inside of the ring 146, 147.

Irrespective of the embodiment of the core 45, to allow the removal by melting of the pedal crank 1 when this has been formed, the core 1 is made from a metal alloy having a low melting point (eutectic), preferably tin, antimony and lead. The alloy has a composition such as to have a melting point slightly higher Tf than the cross-linking temperature Tc of the polymeric material in the various composite materials used to make the body of the pedal crank 1. In particular it is preferable to respect the following relationship:

$$Tf=Tc+\Delta T$$

where Tf is between about 65° C. and about 185° C. and in any case is not more than about 200° C. so as not to damage the composite material; Tc is between about 60° C. and about 180° C.; $\Delta T$ is preferably between about 1° C. and about 25° C., about 5° C. being the preferred value.

The forming elements 50,51 can either be profile-creating inserts, which, when the pedal crank is formed, are removed and replaced with respective coupling inserts 78 and 80, respectively, for coupling with the bottom bracket and with the pedal, or else they can consist of the coupling inserts 78, 80 themselves. In this last case the coupling inserts 78, 80 are co-molded with the pedal crank as described in European patent application no. 05425576.5 to the same Applicant, incorporated herein by reference as if fully set forth.

One or both of the forming elements 50, 51 are associated with a holding element 63, so that, during the molding of the pedal crank, it acts on the bundle 25 on the opposite side with respect to the projecting surface 48b (or 148) of the core 45. As holding element 63 it is possible for example to use a ring nut or a washer screwed onto an external threading 65 formed on the forming elements 50, 51, but the possibility of any other type of coupling is not excluded. In the embodiment of FIG. 4 the holding element 63 has an outer surface portion 64 of lesser thickness, which is intended to face towards the core 45. The advantage of such a configuration is that the core 45 can be moved more towards the insert 50.

In the case of a left pedal crank, like the one illustrated in FIG. 1, the area of maximum stress of the pedal crank is the area for coupling with the bottom bracket, on the side facing towards the frame. For this reason the holding element 63 holds the bundle 25 in this area, whereas in the intermediate portion 15 the bundle 25 is located on the opposite side due to the thrust of the projecting surface 48b (or 148) of the core. In practice, in a left pedal crank manufactured in accordance with the present invention, the bundle 25, going from the intermediate portion 15 of the pedal crank to the end portion 5 for coupling with the bottom bracket of the bicycle, has a substantially S-shaped arrangement.

Since, preferably, the holding element 63 remains trapped in the finished pedal crank, it is desirable for it to be of low weight, therefore it is preferably made from a composite material, of a type selected from those described for manufacturing the rest of the pedal crank, or from a metal alloy, like an aluminum alloy. It has been found that a ring nut made from phenolic resin loaded with 40-50% glass fiber gives excellent performance results combined with a particularly low cost.

Figure 8:
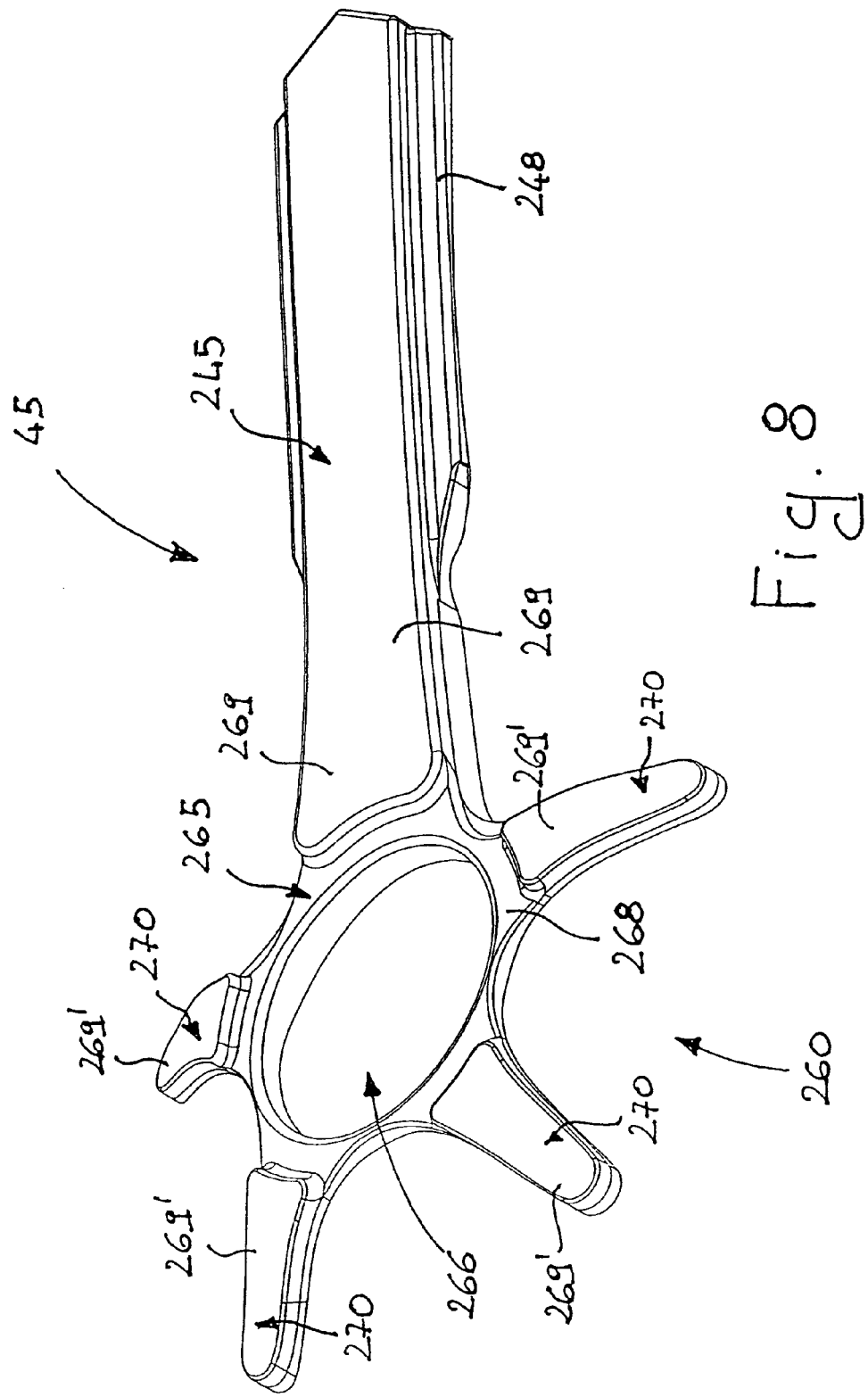
FIG. 8 is a perspective view of a core for manufacturing a right pedal crank according to the invention.
Figure 10:
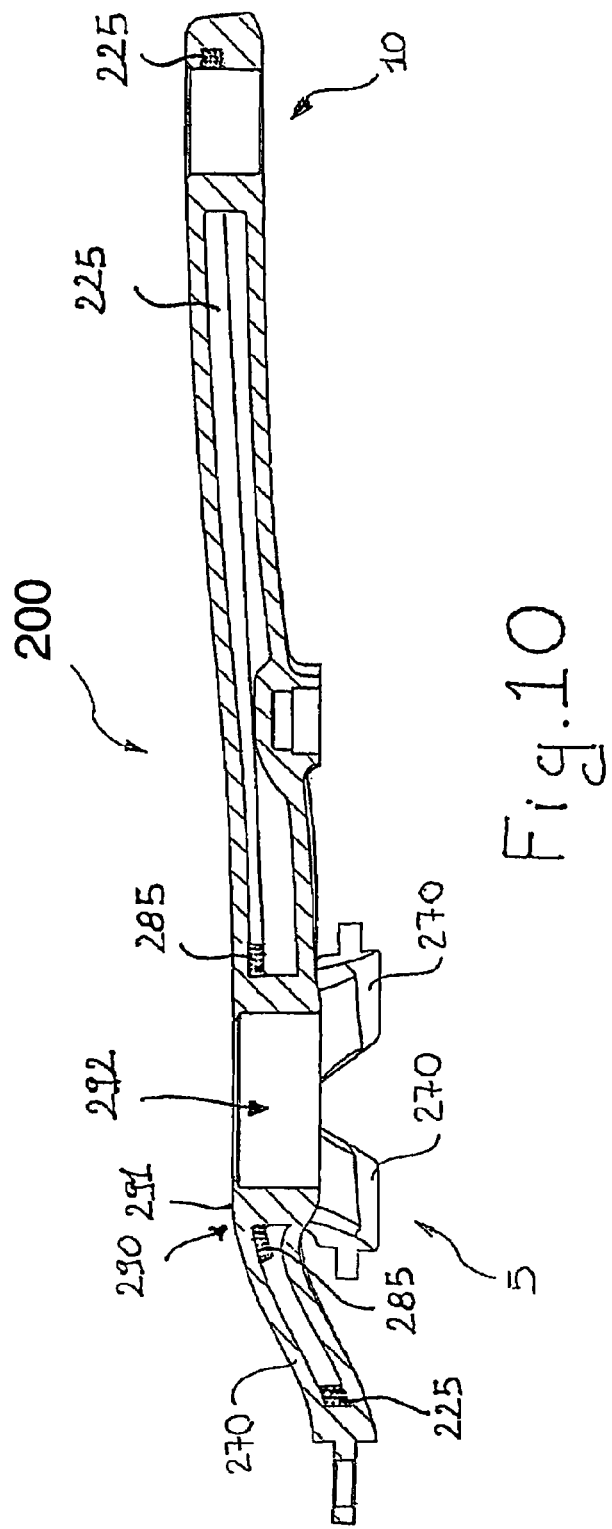
FIG. 10 is a longitudinal section view of a right pedal crank manufactured with the core of FIG. 8.

FIG. 8 illustrates a further embodiment of the core 45, particularly suitable for manufacturing a right pedal crank, indicated with reference numeral 200 in FIG. 10, which has support spokes 270 of the gear wheels at the first end portion 5.

In this embodiment the core 45 comprises an elongated body 245 having an end defining a star 260 with four spokes 270, adapted to form respective cavities in the support spokes of the finished pedal crank.

The elongated body 245 has projecting surfaces 248 that project laterally from the two opposite longitudinal sides thereof. However, differently from what has been described for the embodiments of the core 45 adapted to the manufacture of the left pedal crank 1, the projecting surfaces 248 do not extend for the entire length of the elongated body 245, but rather they are interrupted before they join with the star-shaped portion 260. This promotes the thickening of the body made from composite material of the finished pedal crank at such a join, where there is notoriously a concentration of tensions.

The spokes 270 project radially around a hole 266 having a diameter such as to allow the passage of the forming element 50 (FIG. 9). The periphery 265 of the hole 266 has a height shorter than the height of the spokes 270 and of the elongated body 245. In particular, the front face 268 of the periphery 265 of the hole 266 lies on a plane that is offset with respect to the front faces 269 and 269' of the elongated body 245 and of the spokes 270 respectively, so as to form a recess 265. The recess 265 has the purpose of making, at a front face 291 in the finished pedal crank 200, a thickened area 290 around a seat 292 for the insertion of the coupling insert 78 with the bottom bracket. The spokes of the finished pedal crank shall thus have respective cavities having a height greater than that of the cavity about the seat 292.

FIG. 8a shows a preferred embodiment of the core 45 of FIG. 8. Such a core differs from the one illustrated in FIG. 8 for the sole reason that it comprises four centering elements 271 associated with the periphery 265 of the central hole 266 and extending radially towards the inside of the central hole 266. In particular, the centering elements 271 are associated with the periphery 265 of the central hole 266 at respective thickened areas 272 of such a periphery extending radially towards the inside of the central hole 266.

Such centering elements 271, advantageously, are made from a composite material, of a type selected from those described for manufacturing the rest of the pedal crank. For example, they can be made from phenolic resin loaded with 40-50% glass fiber, or a metal alloy, like an aluminum alloy. The centering elements 271 are to be lost, in the sense that they shall constitute part of the finished pedal crank. Their function is that of keeping the forming element in centered position inside the central hole 266 during the molding of the pedal crank, at the same time avoiding the core from being able to go into abutment against such a forming element (a similar function is carried out by the holding element 63 in a right pedal crank). Typically, indeed, the forming insert of the end portion of the pedal crank has an outer threading for making a corresponding internal threading in the hole of the coupling seat made in the end portion of the pedal crank adapted to couple with the bottom bracket of the bicycle. A possible abutment of the core against such a threading would indeed lead to the generation of areas of discontinuity in the thread formed on the finished pedal crank. On the other hand, the fact that the centering elements 271 are made from the same material as the pedal crank ensures that, during molding, they behave like the rest of the material that shall constitute the finished pedal crank, contributing to the generation of a continuous and uniform profile in the seat for coupling with the bottom bracket of the bicycle.

As better illustrated in FIG. 8b, each centering element 271 comprises a substantially cylindrical body portion 273 and a substantially frusto-conical body portion 274. The centering element 271 is coupled with the respective thickened area 272 of the periphery 265 of the central hole 266 through the respective cylindrical body portion 273, so that its frusto-conical body portion 274 extends canti-levered inside the central hole 266. Advantageously, the coupling with the periphery 265 through the frusto-conical body portion 274 prevents a possible slipping of the centering elements 271 from the respective seats 272 due to micro-breaks or micro-fractures at such a coupling area; such slipping would lead to the presence of solid bodies free to move inside the pedal crank, with the consequent generation of noise during pedalling.

In the embodiment illustrated in FIG. 8a four centering elements 271 arranged at 90° from each other are used. In alternative embodiments, three centering elements are used arranged at 120° apart, or two centering elements arranged symmetrically with respect to the longitudinal axis X-X and positioned in the semi-circle closest to the elongated body 245 of the core 45.

FIG. 9 shows in particular how bundles of unidirectional continuous structural fibers, adapted to define an intermediate reinforcement structure in the finished pedal crank, are preferably associated with the core 45 to form an intermediate product for manufacturing the right pedal crank 200. In particular, a first bundle 225 is wound around the forming element 51 and around the core 45 so as to be supported by the projecting surfaces 248 and so as to follow the profile of the spokes 270; a second bundle 285 is housed in the recess 265 wound in a spiral around the hole 266. Alternatively, the spiral can be formed from a portion of the bundle 225.

In the case of the right pedal crank, the holding element 63 associated with the forming element 50 is superfluous and can be omitted. Indeed, it has been noted that, due to the star-shaped configuration, during molding the filling material flows radially around the forming element 50 and therefore does not generate the shrivelling of the bundles 225 and 285, which can however typically occur during molding of the left pedal crank 1.

The absence of holding elements at the end portions of the right pedal crank ensures that, due to the thrusting of the projecting surface 148, 248 of the core 45 during the molding of the pedal crank, the bundle 25 is arranged along the entire elongated body of the pedal crank on the side facing outwards, right at the area of maximum stress of the right pedal crank, which is indeed located at the area for coupling with the bottom bracket, on the side facing outwards. Advantageously, also the bundle 285 wound in a spiral illustrated in FIG. 10 is arranged on this side.

With particular reference to FIGS. 3, 4, and 10, a preferred embodiment of a method for manufacturing a pedal crank in accordance with the present invention shall now be described. The steps of the method shall be illustrated with particular reference to the left pedal crank 1, but what is described can also be applied without substantial modifications to the manufacture of the right pedal crank 200.

In a first step of the method a core 45 is provided having a shape corresponding to the cavity 20 that is intended to be obtained in the finished pedal crank.

Then the two forming elements 50,51 adapted to form the coupling seats 38, 39 at the end portions 5, 10 of the finished pedal crank are provided.

Then the intermediate product 60 is formed (FIGS. 3 and 4).

The bundle 25 of unidirectional continuous structural fibers is wound in a loop around the core 45, in the housing seats 46, and around the forming elements 50, 51, arranged at the opposite longitudinal ends of the core 45. The layers of filling material 30, 30' are rested on the core 45 on which the sheet 36 is wound so that the preferential directions of extension of the unidirectional continuous structural fibers of the layers 33, 34 form an angle of about 45° with respect to the longitudinal axis X-X of the core 45 (FIG. 3). The layers of filling material 55, 55' are then applied outside the wound sheet 36.

The man skilled in the art will note that the layers of filling material 30, 30', 55,55' can have whatever arrangement, their purpose being to flow when subjected to pressure towards the areas of a mold 70 at which the end portions 5 and 10 of the pedal crank 1 will be formed. Amongst the various possibilities it is also possible to provide the necessary filling material, instead of in layers, in masses positioned in the aforementioned areas.

In a subsequent step of the method, the intermediate product 60 thus obtained is preheated bringing it to a predetermined preheating temperature for a predetermined preheating time which are sufficient to make the polymeric material of the composite material capable of flowing under pressure. Preferably, the intermediate product 60 is kept at a preheating temperature of between about 80° C. and about 100° C. for a sufficient time to heat it homogeneously. More preferably it is kept at a value of between about 85° C. and about 90° C. for a time of between about 35 and about 55 min, so that the core has the time to reach such a temperature before the most outer layer of composite material ages excessively.

Figure 11:
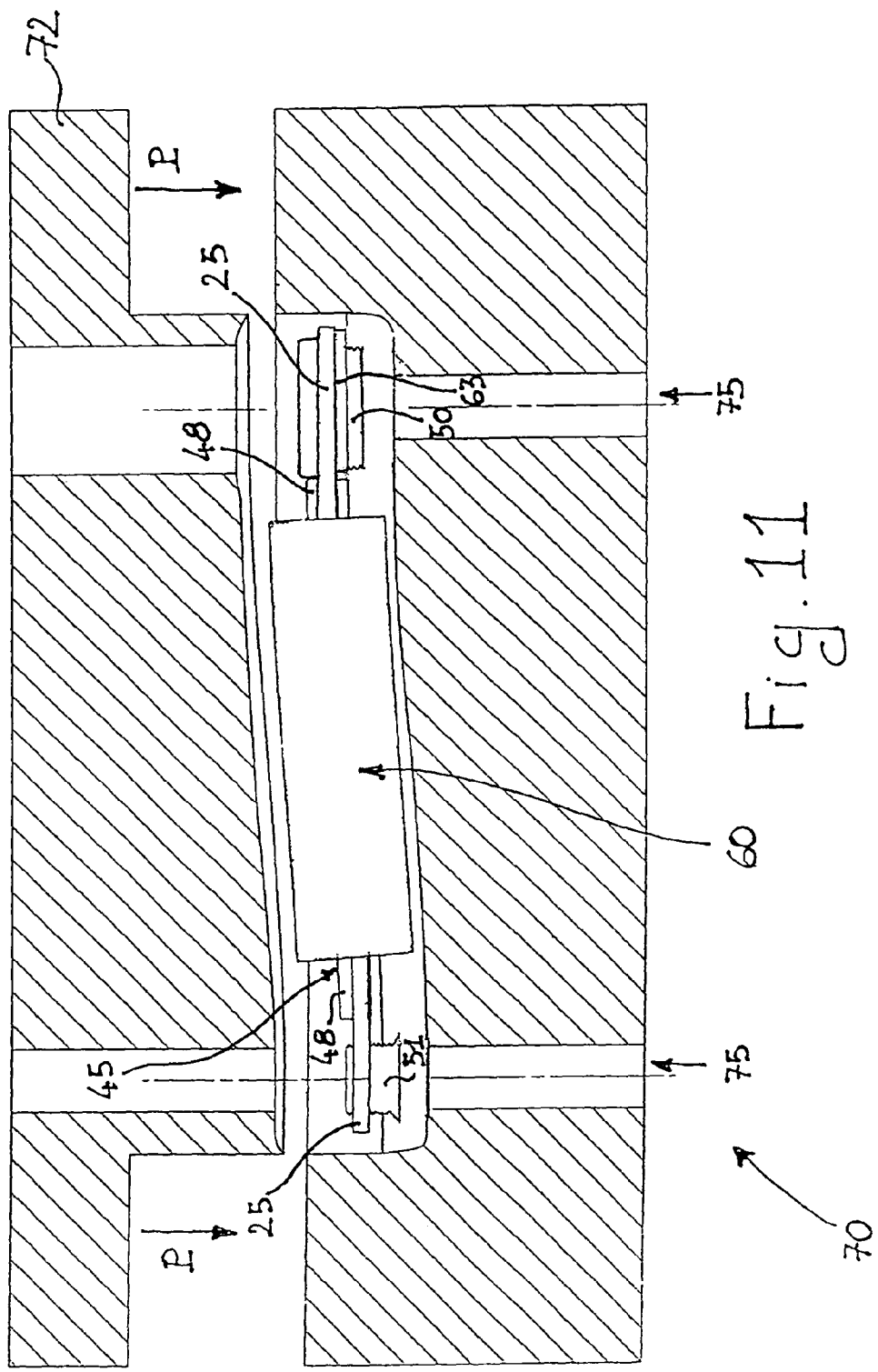
FIG. 11 is a section view of a mold for manufacturing the pedal crank of FIG. 1, having the intermediate product of FIG. 4 in its cavity.

When the intermediate product 60 is sufficiently hot it is inserted into the cavity of a mold 70 (FIG. 11) having the shape of the pedal crank 1 that it is wished to obtain and comprising a pressure element 72 with a predetermined thrusting direction P. In particular, the intermediate product 60 is inserted in such a way that the bundle 25 is closer to the front face 91 of the finished pedal crank than to the rear face 93, and in such a way that the projecting surfaces 48 of the core 45 are arranged between the bundle 25 and the pressure element 72 along the thrusting direction P. The holding elements 63, if present, are arranged in such a way as to hold the bundle 25 counteracting the thrust in the direction P. The two forming elements 50, 51 are preferably fixed to the bottom of the mold 70 through screws applied through holes 75.

As an alternative to what has been described, the intermediate element 60 can be preheated directly inside the mold 70.

In a subsequent step of the method a pressure of between about 5 and about 350 bar is applied through the pressure element 72. Preferably, the pressure applied is selected in the upper area of the aforementioned range, to promote compacting of the material and degasification. In particular, the preferred pressure value is between about 5 bar and about 400 bar, more preferably between about 40 and about 300 bar and even more preferably between about 200 and about 300 bar. The pressure exerted makes the filling material flow until it fills the areas corresponding to the end portions 5, 10 of the pedal crank 1. During the flowing of the filling material, the bundle 25 is kept under tension by the pressure exerted by the projecting surfaces 48 of the core 45, counteracted by the holding elements 63, in this way preventing shrivelling.

When the molding step has ended the mold 70 is brought to a temperature corresponding to the cross-linking temperature Tc of the polymeric material present in the composite material forming the pedal crank 1 for a sufficient time.

In a subsequent step of the method the finished pedal crank 1 is removed from the mold 70.

After a subsequent cooling step, one or more holes 61 are formed in the pedal crank 1, preferably on the rear face 93 intended to face towards the frame of the bicycle, and taking care not to cross the bundle 25. The hole 61 is illustrated with a broken line in FIG. 1 precisely to highlight that it is on the rear face 93 and not on the front face 91. Then the pedal crank is heated up to the melting point Tf of the core 45, which therefore melts and flows out from the hole 61, leaving the cavity 20 free.

Optionally, a washing of the cavity 20 with oil at a predetermined temperature is carried out to remove the melting residues, possibly left stuck to the inner walls, and to avoid them generating undesired noises by detaching during use of the pedal crank.

The hole 61 is then closed preferably by applying a cap of phenolic resin.

What is claimed is:

1. Bicycle pedal crank, comprising an elongated body extending along a longitudinal axis X-X and having:
    a first end portion comprising a first seat for coupling with a bottom bracket of a bicycle;
    a second end portion comprising a second seat for coupling with a pedal;
    an intermediate portion extending between said first end portion and said second end portion and comprising an inner portion without structural strength and a first reinforcement structure, said inner portion consisting of a first cavity defined by said first reinforcement structure; said first and second end portions are integrally formed with the intermediate portion such that the elongated body is monolithic;
    wherein said first reinforcement structure is defined by a tubular structure that is positioned between said first end portion and said second end portion and is no longer than the longitudinal extension of said intermediate portion, said tubular structure comprises at least one sheet of composite material wound around said longitudinal axis X-X.

2. Pedal crank according to claim 1, wherein said at least one sheet of composite material comprises at least one layer of unidirectional continuous structural fibers incorporated in a polymeric material and having a preferential direction of extension.

3. Pedal crank according to claim 2, wherein said structural fibers are selected from the group consisting of: carbon fibers, glass fibers, aramid fibers, boron fibers, ceramic fibers and combinations thereof.

4. Pedal crank according to claim 2, wherein said polymeric material is a thermosetting material.

5. Pedal crank according to claim 2, wherein said preferential direction of extension is inclined with respect to said longitudinal axis X-X by a predetermined first angle.

6. Pedal crank according to claim 5, wherein said predetermined first angle is equal to about 45°.

7. Pedal crank according to claim 1, wherein said sheet of composite material comprises at least two layers each comprising unidirectional continuous structural fibers incorporated in a polymeric material and having a respective preferential direction of extension.

8. Pedal crank according to claim 7, wherein the preferential direction of extension of the structural fibers of a layer is inclined with respect to the preferential direction of extension of the structural fibers of at least one other layer of a predetermined second angle.

9. Pedal crank according to claim 8, wherein said predetermined second angle is equal to about 90°.

10. Pedal crank according to claim 1, wherein said inner portion is defined by a first cavity.

11. Pedal crank according to claim 1, wherein said first and second end portions comprise a composite material comprising structural fibers arranged randomly and incorporated in a polymeric material.

12. Pedal crank according to claim 1, further comprising a second reinforcement structure defined by at least one bundle of unidirectional continuous structural fibers that extends longitudinally in said elongated body.

13. Pedal crank according to claim 12, wherein said second reinforcement structure is arranged, at said intermediate portion, between said inner portion and said first reinforcement structure.

14. Pedal crank according to claim 12, wherein said second reinforcement structure winds in a loop around said first and second end portions and said intermediate portion.

15. Pedal crank according to claim 12, wherein said intermediate portion has a section perpendicular to said longitudinal axis X-X in which said inner portion occupies a space defined by a first area having a first surface extension and by a second area having a second surface extension and wherein said second reinforcement structure occupies a space having a surface extension equal to the difference between said first and second areas.

16. Pedal crank according to claim 12, wherein the fibers of said second reinforcement structure are unidirectional continuous structural fibers extending, at said intermediate portion, substantially parallel to said longitudinal axis X-X.

17. Pedal crank according to claim 12, wherein said pedal crank is a left pedal crank.

18. Pedal crank according to claim 17, wherein said elongated body has a first face intended to face a bicycle frame and a second face opposite said first face and wherein said second reinforcement structure is arranged in said elongated body so that, at said first end portion of the pedal crank, said second reinforcement structure is closer to said first face than to said second face.

19. Pedal crank according to claim 12, wherein at least one of said end portions of said elongated body further comprises, at least one holding element of a portion of said second reinforcement structure.

20. Pedal crank according to claim 19, wherein said at least one holding element is defined by a ring nut.

21. Bicycle pedal crank, having an elongated body extending along a longitudinal axis X-X comprising:
    a first end portion comprising a first seat for coupling with a bottom bracket of a bicycle;
    a second end portion comprising a second seat for coupling with a pedal;
    an intermediate portion extending between said first end portion and said second end portion and comprising an inner portion and a first reinforcement structure;
    wherein said first reinforcement structure comprises a single tubular structure arranged around said inner portion, said tubular structure extending continuously between said first end portion and said second end portion and being no longer than the longitudinal extension of said intermediate portion, said inner portion consisting of a first cavity defined by said first reinforcement structure, and said first and second end portions comprise a composite material comprising structural fibers arranged randomly and incorporated in a polymeric material, the pedal crank further comprising a second reinforcement structure defined by at least one bundle of unidirectional continuous structural fibers that extends longitudinally in said elongated body, and wherein said pedal crank is a left pedal crank, and said elongated body has a first face intended to face a bicycle frame and a second face opposite said first face and wherein said second reinforcement structure is arranged in said elongated body so that, at said first end portion of the pedal crank, said second reinforcement structure is closer to said first face than to said second face.

* * * * *